US009565637B2

(12) United States Patent
Tran et al.

(10) Patent No.: US 9,565,637 B2
(45) Date of Patent: Feb. 7, 2017

(54) HIGH POWER CHANNEL STATE NOTIFICATION FOR MOBILE APPLICATIONS

(71) Applicant: T-Mobile USA, Inc., Bellevue, WA (US)

(72) Inventors: Antoine Tran, Bellevue, WA (US); Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/831,329

(22) Filed: Mar. 14, 2013

(65) Prior Publication Data

US 2014/0269469 A1 Sep. 18, 2014

(51) Int. Cl.
*H04W 52/02* (2009.01)
*H04L 29/08* (2006.01)

(52) U.S. Cl.
CPC .......... *H04W 52/0251* (2013.01); *H04L 67/00* (2013.01); *H04W 52/0254* (2013.01); *H04W 52/0258* (2013.01); *H04W 52/0274* (2013.01)

(58) Field of Classification Search
CPC .................................................. H04W 52/02
USPC ........................................................ 370/311
See application file for complete search history.

(56) References Cited

U.S. PATENT DOCUMENTS 8,130,654 B2 * 3/2012 Garcia-Luna-Aceves et al. ............................. 370/236
8,335,175 B2 * 12/2012 Das et al. ...................... 370/311
8,391,307 B2 * 3/2013 Karmakar et al. ............ 370/412
8,588,064 B2 * 11/2013 Beverly et al. ................ 370/230
8,984,078 B2 * 3/2015 Nerieri .................... H04L 67/10
709/206

(Continued)

FOREIGN PATENT DOCUMENTS

JP 11-507777 7/1999
JP 2009-512258 3/2009

(Continued)

OTHER PUBLICATIONS

International Searching Authority, International Search Report and Written Opinion, PCT Application PCT/US2014/026860, mailed Jul. 17, 2014, 11 pages.

(Continued)

*Primary Examiner* — Hassan Kizou
*Assistant Examiner* — Abdullahi Ahmed
(74) *Attorney, Agent, or Firm* — Perkins Coie LLP

(57) ABSTRACT

Systems and methods for providing high power channel state notification, management, and optimization are provided. In some embodiments, data transmissions from mobile devices to remote servers are managed. For example, the operating system, lower level apparatus, or software bundle, sequentially align, or otherwise coordinate the messages to be transmitted during each high power channel state. In addition, the impact to the application and user experience can be utilized in managing the transmissions. In some cases, various embodiments provide the application with the knowledge (e.g., the optimal moment, transmission schedule, etc.) for the transmission of its data. In addition, some embodiments allow the application to piggy back a data transmission that might otherwise be delayed on already open high speed channel to increase the devices performance data transfer.

23 Claims, 10 Drawing Sheets

(56) References Cited

U.S. PATENT DOCUMENTS

| | | | |
|---|---|---|---|
| 2004/0040025 A1 | 2/2004 | Lehtinen | |
| 2007/0076720 A1* | 4/2007 | Wu | 370/392 |
| 2008/0299960 A1* | 12/2008 | Lockhart et al. | 455/418 |
| 2011/0065375 A1* | 3/2011 | Bradley | 455/1 |
| 2012/0023190 A1 | 1/2012 | Backholm et al. | |
| 2012/0236772 A1 | 9/2012 | Kondratiev | |
| 2013/0010693 A1 | 1/2013 | Luna et al. | |
| 2013/0329637 A1* | 12/2013 | Kodali et al. | 370/328 |
| 2014/0051485 A1* | 2/2014 | Wang et al. | 455/574 |

FOREIGN PATENT DOCUMENTS

| | | |
|---|---|---|
| KR | 10-2006-0130749 | 12/2006 |
| KR | 10-2010-0057672 | 5/2010 |

OTHER PUBLICATIONS

European Patent Office, Extended European Search Report, EP Patent Application 14768848.5, mailed Sep. 15, 2016, 9 pages.

\* cited by examiner

HIGH POWER CHANNEL STATE NOTIFICATION FOR MOBILE APPLICATIONS

BACKGROUND

Modern mobile electronic devices (such as mobile phones, personal digital assistants, computer tablets, or the like) have become a common part of modern life. These devices increasingly provide advanced computing capabilities along with a variety of other features and options that improve the user's experience with the device. Some common examples of the features and options include cameras, WiFi, SMS and MMS messaging, web browsers, voice/video calling, and GPS capabilities. In addition to these common features and options, modern electronic devices often include operating systems that can run software applications on one or more processors. The software applications can be installed (e.g., by the manufacture or by the user) on these devices to perform a variety of specific tasks and/or extend the functionality of the devices.

The software applications may use many of the hardware and other software components of the mobile devices. As the demands and functionality of the software applications increase, so does the frequency of use for these components. Not only are the demands and functionality increasing, but the mobile devices are becoming smaller and the processor(s), features, and applications are placing higher demands on the power resources. As with any mobile device, managing limited power resources is important. As such, techniques are needed that improve the utilization of the limited power resources without negatively impacting the user's experiences.

BRIEF DESCRIPTION OF THE DRAWINGS

Embodiments of the present invention will be described and explained through the use of the accompanying drawings in which.

Figure 1:
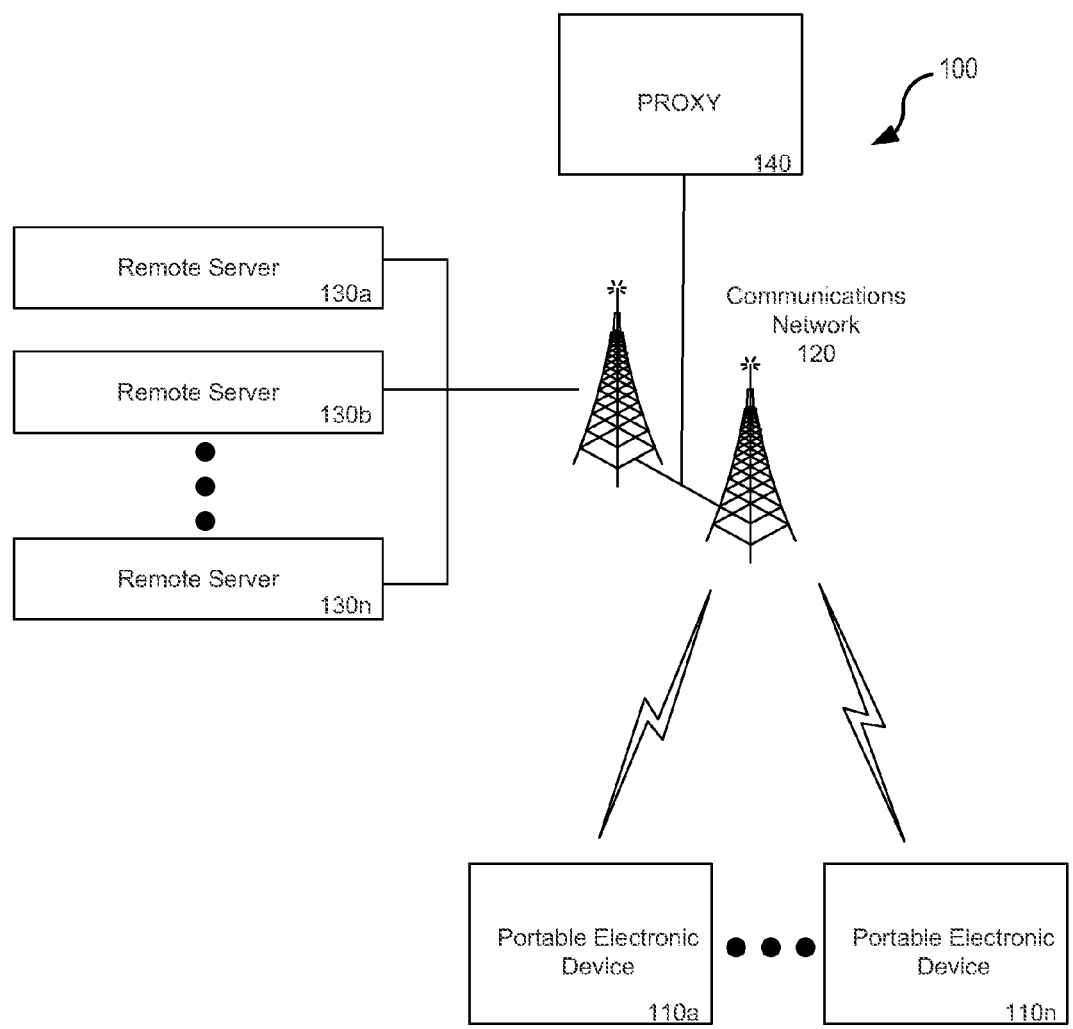
FIG. 1 illustrates an example of a communications environment in which some embodiments of the present invention may be utilized.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In order to save power, mobile networks and devices often go to a lower power mode when connected to a network but not transferring information. This low power mode is typically reached after a guard period following the end of data transmission from/to the mobile device. In order to transmit, the network and mobile device need to switch to the high power mode for data transmission. The switching is done via specific signaling and generally takes some time.

Currently, mobile applications that need to check-in with their application server communicate in a non-coordinated way. The uncoordinated transmissions incur unnecessary power consumption during the frequent switching from low power modes to high power modes and during the guard period for each of multiple applications. Various embodiments of the present invention generally relate to high power channel state notification, management, and optimization. In particular, some embodiments manage data transmissions from mobile devices to remote servers using high power channel state notification and management techniques.

In some embodiments, the operating system, lower level apparatus, or software can bundle or otherwise coordinate the data to be transmitted during a single high power channel state. This can be done, for example, by delaying lower priority data transmissions. Simply bundling the data, however, does not account for the impact to the application when the communication with their application server is unexpectedly delayed as check-in message may contain time critical information. In some cases, various embodiments provide the application with the knowledge (e.g., the optimal moment, transmission schedule, etc.) for the transmission of its data. In addition, some embodiments allow the application to piggy back a data transmission that might otherwise be delayed on an already open high speed channel to increase the device's performance.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. While, for convenience, embodiments of the present invention are described with reference to application messaging and coordination of a high power channel on a mobile device, embodiments of the present invention are equally applicable to various other signals or components that could benefit from coordinated use. Moreover, these techniques are equally applicable to not only the device side but also to coordinating messages on the network side.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

FIG. 1 illustrates an example of a communications environment 100 in which some embodiments of the present invention may be utilized. As illustrated in FIG. 1, communications environment 100 may include one or more mobile devices 110a-n (such as a mobile phone, tablet computer, mobile media device, mobile gaming device, vehicle-based computer, etc.), communications network 120, remote servers 130a-n, and a proxy node 140. To allow a user to make use of the various services and features of the mobile device, the mobile device can include a display, a keypad, touchpad or touch screen, a microphone, applications, and/or a speaker.

In addition, mobile devices 110a-n can include network communication components that enable the mobile devices to communicate with remote servers 130a-n or other portable electronic devices by transmitting and receiving wireless signals using licensed, semi-licensed or unlicensed spectrum over communications network 120. In some cases, communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in mobile device 110a-n to enable network communication. For example, a mobile device may be configured to communicate over a GSM mobile telecommunications network. As a result, the mobile device may include a Subscriber Identity Module (SIM) card that stores an International Mobile Subscriber Identity (IMSI) number that is used to identify the mobile device on the GSM mobile communications network or other networks, e.g. those employing 3G and/or 4G wireless protocols. If the mobile device is configured to communicate over another communications network, the mobile device may include other components that enable it to be identified on the other communications networks. In some embodiments, mobile devices 110a-n include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN.

Figure 2A:
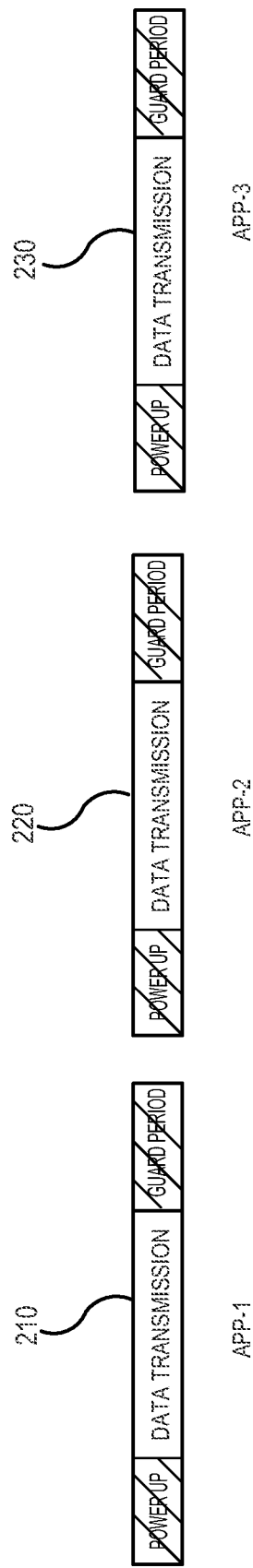
FIGS. 2A-2B illustrate data transmissions within a mobile device utilizing the data transmission techniques in accordance with various embodiments of the present invention.

Mobile devices 110a-n may include one or more mobile applications that need to transfer data or check-in with remote servers 130a-n. These applications generally send a request to transfer data which results in the mobile devices activating a high power channel for data transmission. In order to save energy, when not transferring data, mobile devices 110a-n may transition from a high power mode into a lower power mode. As illustrated in FIG. 2A, the lower power mode is typically reached after a guard period following the end of data transmission from/to the mobile device. In order to transmit, the network and mobile device then need to switch to the high power mode for data transmissions.

In some embodiments, mobile device 110a-n can determine opportune times for receiving messages. This information can be communicated to proxy node 140 which can coordinate when messages from remote servers 130a-n are sent to mobile device 110a-n. Proxy node 140 can also be used to generate notifications when there is a change in radio state (e.g., possibly notify only after a long period of silence to avoid too much signaling), inform about radio frequency (e.g., quality of channel), and load in the network as seen by the mobile device 110a-n (e.g., to enable opportunistic transmission of data during non-busy hours). Proxy node 140 can be a separate node on the core network (e.g., SMP gateway).

Figure 2B:
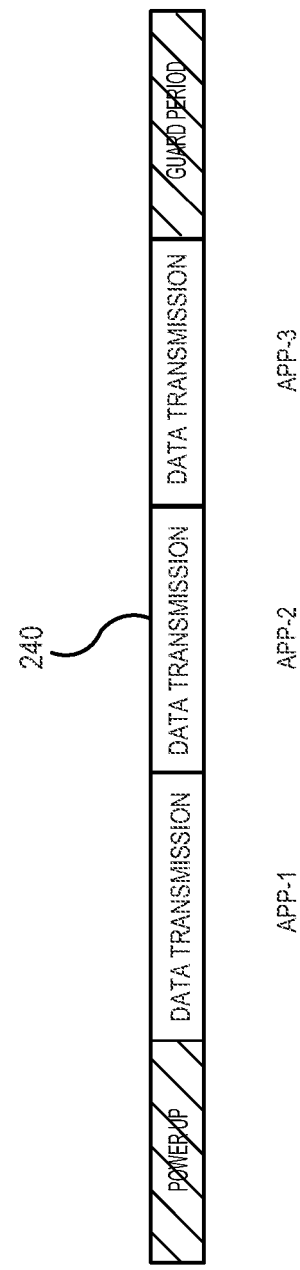

As a result of the lack of coordination between the data transmissions, traditional mobile devices incur unnecessary power consumption during the switching from low power to high power and during the guard period. In contrast, various embodiments of the present invention use the operating system, lower level apparatus, or software to bundle or sequentially align the data to be transmitted during a single high power state as illustrated in FIG. 2B. As a result of coordinating multiple data transmissions during a single high power state, transitions between the high power state and the low power state can be reduced thus saving energy. While FIG. 2B shows the sequential transmission of the messages, some embodiments allow for multiple messages to be sent simultaneously or in parallel.

Figure 3:
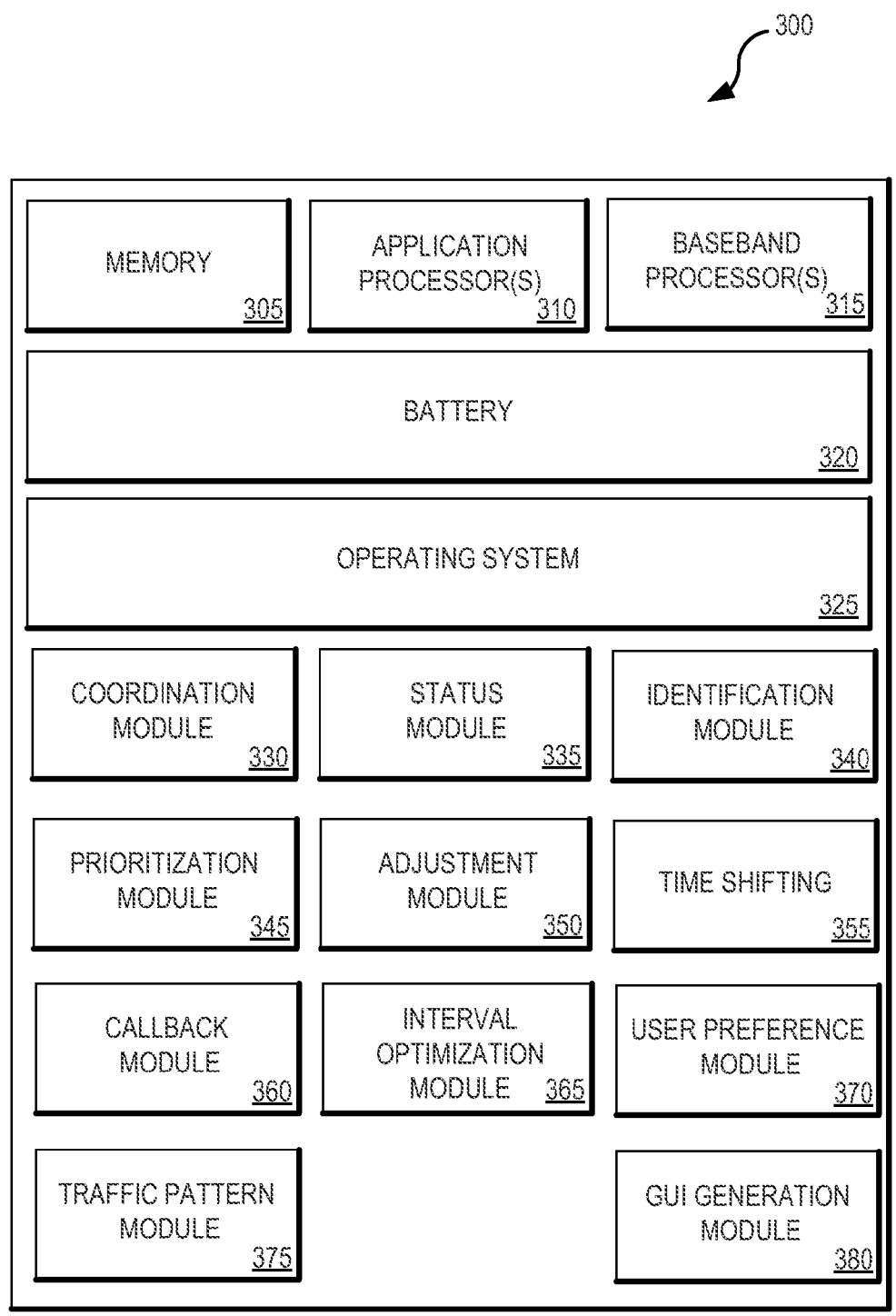
FIG. 3 illustrates a set of components within a mobile device according to one or more embodiments of the present invention.

FIG. 3 illustrates a set of components within a mobile device 110 according to one or more embodiments of the present invention. According to the embodiments shown in FIG. 3, mobile device 110 can include memory 305, one or more application processors 310, baseband processors 315, battery 320, operating system 325, coordination module 330, status module 335, identification module 340, prioritization module 345, adjustment module 350, time shifting module 355, callback module 360, interval optimization module 365, user preference module 370, traffic pattern module 375, and graphical user interface (GUI) generation module 380. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, coordination module 330 and time shifting module 355 can be combined into a single module for coordinating data transfers.

Memory 305 can be any device, mechanism, or populated data structure used for storing information. In accordance with some embodiments of the present invention, memory 305 can encompass any type of, but is not limited to, volatile memory, nonvolatile memory and dynamic memory. For example, memory 305 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305

Memory 305 may be used to store instructions for running one or more applications or modules on application processor(s) 310. For example, memory 305 could be used in one or more embodiments to house all or some of the instructions needed to execute the functionality of operating system 325, coordination module 330, status module 335, identification module 340, prioritization module 345, adjustment module 350, time shifting module 355, callback module 360, interval optimization module 365, user preference module 370, traffic pattern module 375, and/or GUI generation module 380.

Application processor(s) (AP) 310 are the main processors of mobile device 110. Application processor(s) provide the processing power to support software applications, memory management, graphics processing, and multimedia. AP 310 is communicably coupled with memory 305 and configured to run the operating system, the user interface, and the applications stored on memory 305. Baseband processor 315 is configured to perform signal processing and implement/manage real-time radio transmission operations of mobile device 110. These processors along with the other components may be powered by battery 320 or other power source.

Mobile operating system 325 provides a software package that is capable of managing the hardware resources of mobile device 110. Mobile operating system 325 can also provide common services for software applications running on AP 310. In accordance with various embodiments of the present invention, mobile operating system 325 can coordinate the data to be transmitted during each high power channel state of mobile device 110. This can be done, for example, using coordination module 330.

In accordance with some embodiments, coordination module 330 can be configured to receive data transmission requests from the applications running on AP 310. Once the requests have been received, coordination module 330 can bundle or sequentially align the data to be transmitted from the mobile device 110 to remote servers during each radio transmission. In some embodiments, coordination module 330 is communicably coupled to status module 335 which can be used to determine contextual information about the state of mobile device 110. Using the contextual information, coordination module 330 can determine how to best coordinate the messages from the applications. Examples of contextual information that can be determined include, but are not limited to, information indicative of a screen status, a level of battery 320, active applications, a state of a web browser, user preferences, user behavior profile (i.e., a profile that links the user interaction with an application to a data transmission schedule), movement of the mobile phone, congestion information related to the communications network, and application priority.

Identification module 340 can be used to identify the application originating each transmission request. Identifying information may be contained within message headers, file names, file types, precursor messages, selected protocol, and/or in other forms. In addition, in some embodiments, an application may have an associated priority/urgency level and/or be able to associate a priority/urgency level with the message. Identification module 340 can also be used to determine the priority/urgency level assigned or associated with the application or an individual message. In some embodiments, a dynamic priority level can be assigned and/or changed based on the contextual information determined by status module 335.

Prioritization module 345 can receive the contextual information from status module 335 and to prioritize/schedule the messages relative to one another based on the contextual information. In some embodiments, prioritization module 345 can receive information about the identity and/or initial priority level assigned by the application. This information can be used along with the contextual information to prioritize the messages. In some embodiments, prioritization module 345 can sort the messages into different message queues with an assigned priority level.

Adjustment module 350 can be used in various embodiments of the present invention to shift the timing of the routine (or periodic) message requests from the applications. For example, some applications routinely ping a remote server in order to retrieve status updates or other information. These routine messages may occur on a predefined schedule (e.g., periodically). In some embodiments, adjustment module 350 can return a delay signal to the applications indicating an amount of time the application should shift, either forward or backward in time, the next message to be sent. In other embodiments, the applications may not be configured to receive timing adjustments from timing module 350. In these cases, time shifting module 355 can be used to shift in time (e.g., by using one or more queues) data transmissions from the applications. In some embodiments, adjustment module 350 can monitor or receive a network restrain transmission indicating that the network would like messages to be delayed. For example, the network may requests messages be delayed during situations where the network is overloaded or is experiencing a high interference. During this time adjustment module 350 may be more aggressive with time shifting and bundling.

Callback module 360 can be used in various embodiments to receive transmission notification subscription requests from the applications and generate a callback to the application to send the data and/or transmission messages. In some embodiments, callback module 360 can be communicably coupled with coordination module 330 and receive timing inputs that allow multiple messages and/or data from the applications to be sequentially aligned, bundled, or otherwise coordinated within each transmission from the mobile device.

In order to determine an optimal arrangement and timing for each high power transmission, various embodiments of the present invention use interval optimization module 365. Interval optimization module can utilize a variety of information in determining the best arrangement and time for the high power transmissions. For example, contextual information about the state of mobile device 110 can be used. In some cases, user preferences set by the user of mobile device 110 can be used. These preferences can be tracked and enforced with the use of user preference module 370. Still yet, in some embodiments, traffic pattern module 375 can monitor the traffic patterns of the application messages for each application and for mobile device 110 over different periods of time. Then, traffic pattern module 375 may analyze the collected traffic patterns to determine optimal arrangements and timing for the high power transmissions.

In some cases, the timing of the transmissions determined by interval optimization module 365 may be event driven. For example, traffic pattern module 375 may notice that when the user turns on the screen, a high power channel is often needed (e.g. the user is likely about to make a call or send a message). As such, interval optimization module 365 may request a high power mode upon the detection of a change in the screen state to active. This not only minimizes the delay the user could experience, but also provides an opportunity for pending messages (e.g., in the different priority level queues) to piggy back on high power state generated by the detected event.

Other events that could be used to induce a transition to a high power state could include, but are not limited to, detecting movement of the mobile device, opening a browser, along with combinations of these and other events. In some embodiments, interval optimization module 365 may set a maximum time limit for the detection of a desired user action (e.g., using the browser) based on the event driven high power state. Interval optimization module may also consider other contextual information such as the state of battery 320 and/or network congestion.

In some embodiments, a determination can be made of the maximum delay an application can withstand before it would negatively affect the user's experience. The application may report this information directly to operating system 325. In other cases, this information can be estimated by traffic pattern module 375. In at least one embodiment of the present invention, interval optimization module 365 can use this information to make a decision to falsely report to the applications on the availability to connect to the servers. As a result of receiving the false information the application may suspend routine status messages (e.g., advertising updates) that will not negatively impact the user's experience with the application. Further, some messages or applications may have a maximum delay time or maximum time limit. Thus the interval optimization module 365 may manage such maximums and force a message to be transmitted when the maximum delay time has been reached, even if such a transmission at that time is not optimal for the system.

GUI generation module 380 can generate one or more GUI screens that allow for interaction with a user of the mobile device. In at least one embodiment, GUI generation module 380 generates a graphical user interface allowing a user of the mobile device to set preferences, present reports, prioritize applications, prioritize application functionality, set device constraints, and/or otherwise receive or convey information to the user.

Figure 4:
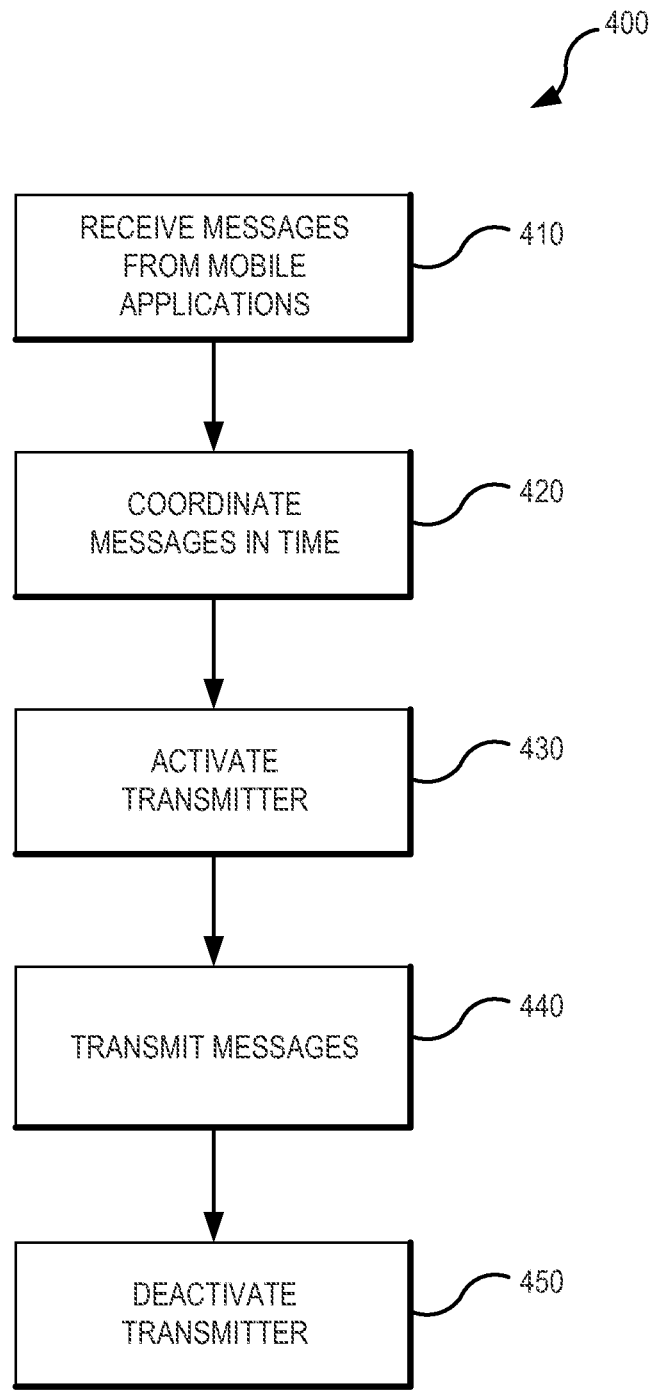
FIG. 4 is a flowchart illustrating a set of operations for transmitting messages in accordance with some embodiments of the present invention.

FIG. 4 is a flowchart illustrating a set or series of operations 400 for transmitting messages in accordance with some embodiments of the present invention. The operations illustrated in FIG. 4 can be performed by one or more components (e.g., application processor), engines, and/or modules (e.g., coordination module 330) associated with the mobile device. Initially, receiving operation 410 receives messages from mobile applications running on applications processor(s) 310. Coordination operation 420 coordinates the messages in time to allow for multiple transmissions to occur during each high power state of the mobile device. Activation operation 430 activates the radio transmitter of the mobile device allowing transmission operation 440 to transmit the multiple coordinated messages within the high power state of the mobile device. In some embodiments, transmission operation 440 may invite other applications which have registered for a transmission call back to submit messages before or during transmission. Once the last transmission has been transmitted, after a guard period the transmitter can be deactivated during deactivation operation 450.

Figure 5:
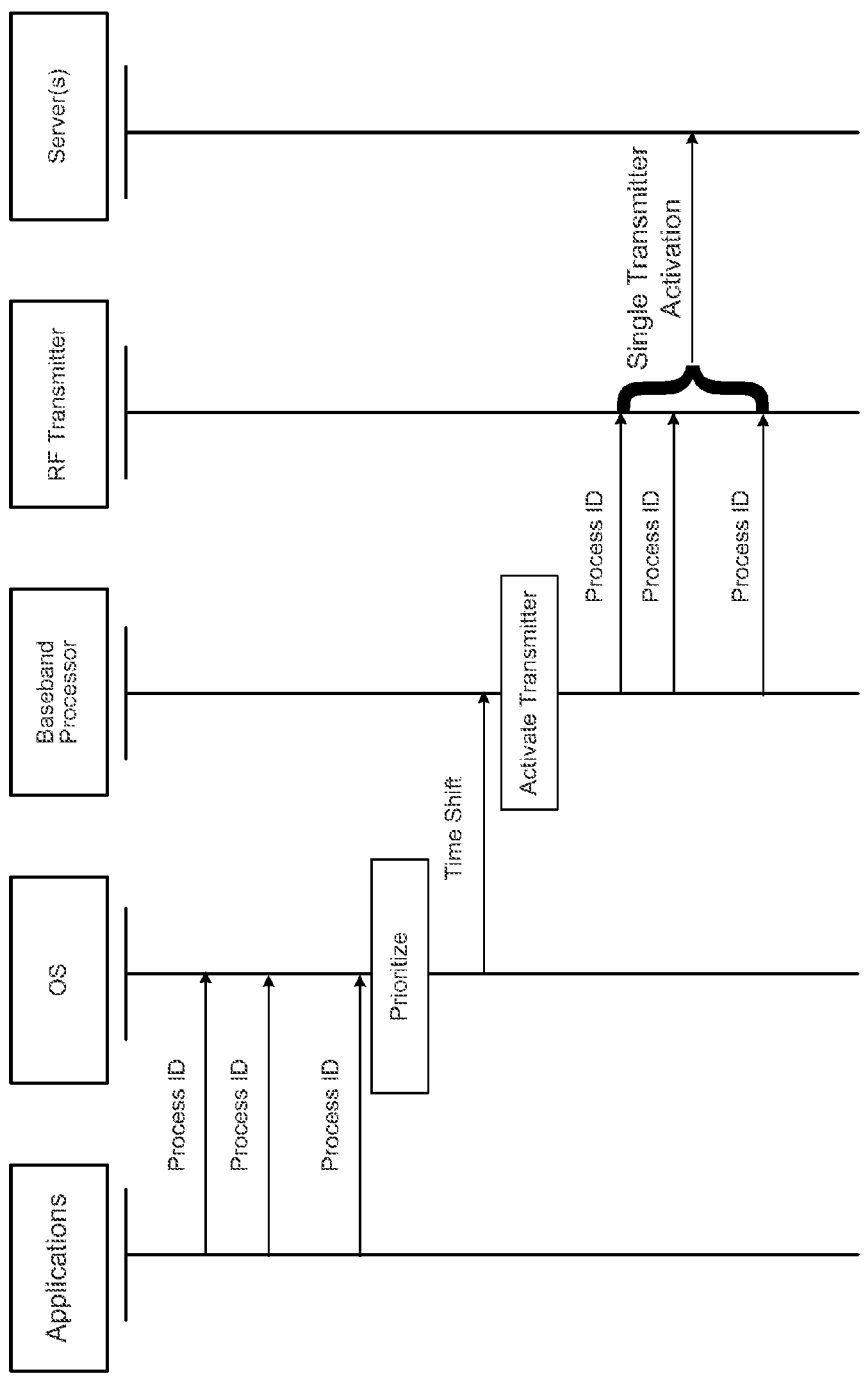
FIG. 5 is a sequence diagram illustrating an example of the data flow between various components of a communications system according to various embodiments of the present invention.

FIG. 5 is a sequence diagram illustrating an example of a data flow between various components of a communications system according to various embodiments of the present invention. Applications running within the mobile device submit messages to an operating system running on the mobile device. Each application may be registered with the OS and associated with an ID, which can be incorporated into the process ID assigned to the message sent from the application. Within the process ID, additional information can be included such as an application message priority level. The operating system prioritizes the messages and determines an appropriate time shift. For example, some messages may be time critical and be required to be sent immediately. Other messages may be able to be delayed for only a period of time. Still yet, some messages may be able to be delayed indefinitely without affecting either the application or the user's experience. In some embodiments, the application may inform the operating system of a maximum delay period.

This time shift can be communicated to the baseband processor of the mobile device, which then activates the radio frequency transmitter and sends all of the messages to the servers in a single transmitter application. In some cases, the transmitter may only be allowed to be activated for a maximum length of time. In those cases, the operating system can use this information during the prioritization to determine which messages should be sent during the single transmitter activation. In some embodiments, when an application submits a message while the transmitter is activated, the OS can determine if there is sufficient time remaining to allow the message to piggy back onto the current transmission. The OS can also send a request to send to applications that have requested to receive a call back (e.g., by registering with call back module 360).

In various embodiments, modifications of the operating system and application development framework or software development kit (SDK) are used to integrate a mechanism to provide applications with the availability status of the high power channel. Depending on the operating system, the information can be provided as an event broadcast or a call back. In the case of an event broadcast, the application that is listening to the event can trigger proper action when the event occurs. In the case of the call back, the application will register a function that will be executed when the high power channel is available.

One example of a call back algorithm can be managed as follows: 1) application receives high speed channel available (i.e., active and ready to transmit) event; and 2) if the next application check-in time is within the current time and the current time plus the guard period, then the application should check-in. The guard period can be pre-configured in the operating system communication layers or can be dynamically loaded from the network as the operator, device, or system component adjusts the value for optimization purposes.

An example of a partial implementation on an Android operating system includes using a background Android service that listens for the operating system data activity state: DATA_ACTIVITY_NONE (of the TelephonyManager class). When this event occurs, the service checks in with the radio interface layer (RIL) for the modem RRC status (DCH) and broadcasts the "high power channel available" event through a custom Android Intent broadcast using "Context.sendBroadcast( )" when the RRC status is DCH and DATA_ACTIVITY_NONE=0. The service may check-in with a network server for the guard period configuration provided by the network.

Figure 6:
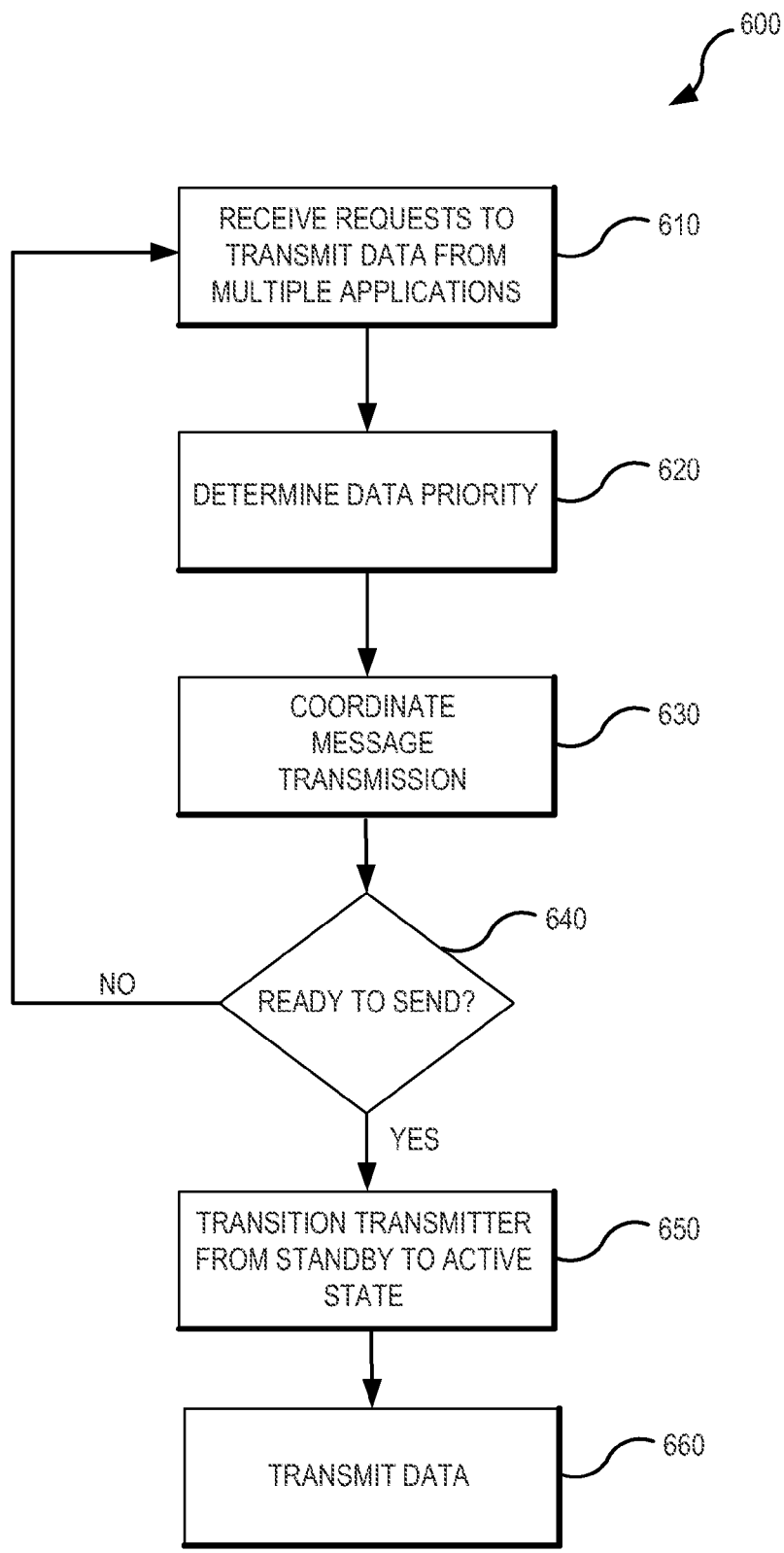
FIG. 6 is flowchart illustrating a set of operations for coordinating message transmissions in accordance with one or more embodiments of the present invention.

FIG. 6 is flowchart illustrating a set or series of operations for coordinating message transmissions in accordance with one or more embodiments of the present invention. The operations illustrated in FIG. 6 can be performed by one or more components (e.g., applications processor 310 and baseband processor 315), engines, and/or modules (e.g., coordination module 330) associated with the mobile device. As illustrated in FIG. 6, requests to transmit data can be received during receiving operation 610. These requests can originate from multiple applications running on the mobile device. Priority determination operation 620 makes a determination of the data priority. In some embodiments, for example, each application may be pre-assigned a priority which is then associated with the data. In other cases, the content of the data may be used to determine the message priority. Still yet, various embodiments of the present invention can dynamically adjust the priority levels of the data based on contextual information, user preferences, and/or policies. For example, when a low battery is detected, the priority of certain messages may decrease.

Coordination operation 630 coordinates the data transmissions so that the data associated with multiple messages can be sequentially aligned within each transmission. This can be done, for example, using queues or callback module 360. For example, callback module 360 may coordinate with applications which have registered for transmission. If decision operation 640 decides that a high power channel is needed to send the messages (e.g., based on queue depth, time since last transmission, message priority, etc.), decision operation 640 branches to activation operation 650 which transitions the radio transmitter from a standby (or off) state to an active state. This allows transmission operation to use the radio transmitter to transmit the data. If decision operation 640 determines that a high power channel is not currently needed, then decision operation 640 branches to receiving operation 610 to receive more transmission requests.

Figure 7:
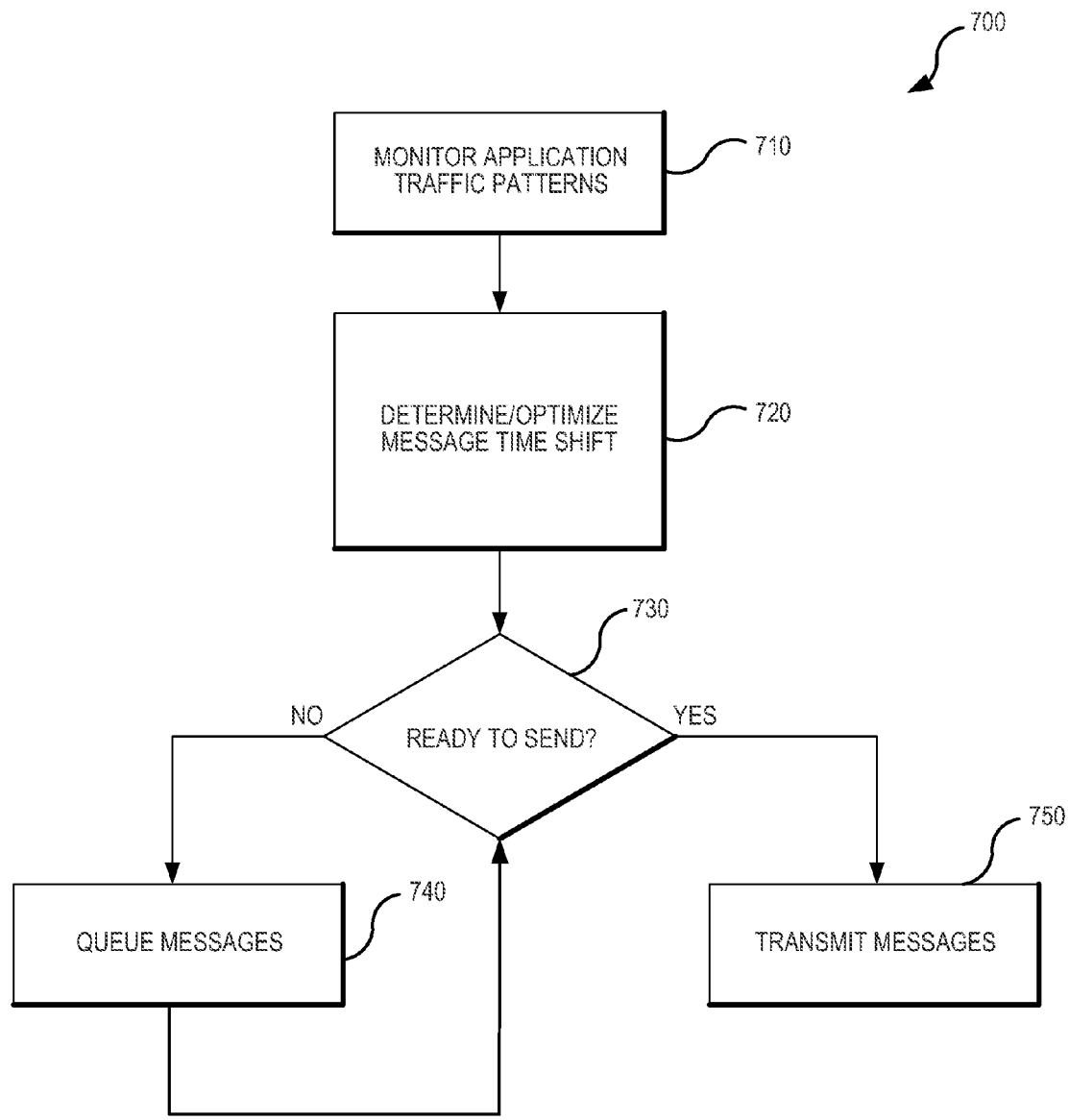
FIG. 7 is a flowchart illustrating a set of operations determining message time shifts in accordance with some embodiments of the present invention.

As previously mentioned, many applications routinely or periodically send messages to remote servers. In some cases, it may be desirable to adjust or shift the timing of these messages so that they are better aligned. FIG. 7 is a flowchart illustrating a set of operations determining message time shifts in accordance with some embodiments of the present invention. The operations illustrated in FIG. 7 can be performed by one or more components (e.g., application processor), engines, and/or modules (e.g., coordination module 330, interval optimization module 365, etc.) associated with the mobile device.

During monitoring operation 710, the traffic patterns and usage of the mobile device and applications are monitored. A single monitoring period or multiple monitoring periods can be used to collect the initial set of data. Using the initial set of data collected during monitoring operation 710, shift determination operation 720 can determine a time shift for one or more of the applications. The time shift may be a general static shift applied to all future messages from an application and/or a limited shift (e.g. single use) to adjust only a finite number of future messages. For example, the system may desire an application to ultimately shift the routine messages by a minute so that the transmissions better align with the transmissions requests of other applications. However, the application may not be able to withstand more than a twenty second adjustment without negatively impacting the user's experience with the application. As such, shift determination operation 720 may assign a limited shift having three twenty second shifts. In other cases, shift operation 720 may determine that no time shifting is necessary (e.g., when transmitter is in an active or high power state).

If sending decision 730 determines that messages do not need to be transmitted, the messages can be queued using queuing operation 740. Queuing operation 740 can track the time shifts assigned by shift determination operation for each message. When sending decision 730 determines that messages are ready to be transmitted, transmission operation 750 opens the high power channel and transmits the messages.

Figure 8:
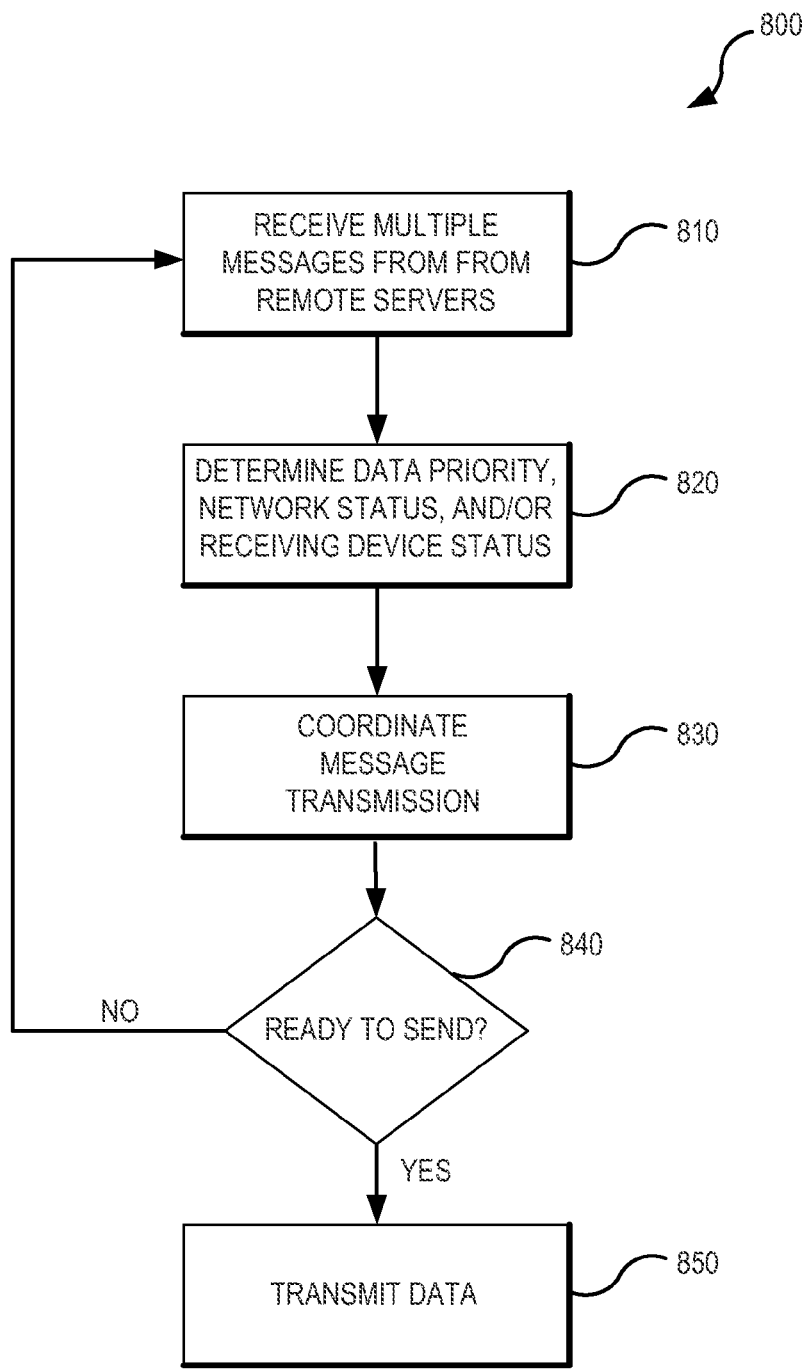
FIG. 8 is a flowchart illustrating a set of operations for coordinating messages on a communications network according to various embodiments of the present invention.

While various embodiments of the present invention are applicable to coordinating messages on a mobile device for transmission to one or more remote servers, some embodiments use these same techniques on the network side. FIG. 8 is a flowchart illustrating a set of operations 800 for coordinating messages on a communications network. Requests to transmit data from one or remote servers can be received during receiving operation 810. Determination operation 820 makes a determination of the data priority associated with the requests (e.g., real-time data such as that used in voice over IP could have a higher priority than a text message), the current status of the communications network, and/or the current status of the receiving device. In some embodiments, each receiving device may have a priority based on selected data plans, current status, or other parameters. This priority can be associated with the data. In some cases, the congestion of the network may be used to adjust message priority levels dynamically.

Coordination operation 830 coordinates the data transmissions from the network to the receiving devices so that the data associated with multiple messages can be sequentially aligned or simultaneously delivered within each transmission. This can be done, for example, using queues or time shifts. If decision operation 840 decides that the messages are ready to be sent, decision operation 840 branches to transmission operation 850 which transmits the messages to the receiving devices. If decision operation 840 determines that the messages are not ready to be sent, then decision operation 840 branches to receiving operation 810 to receive more transmission requests.

Figure 9:
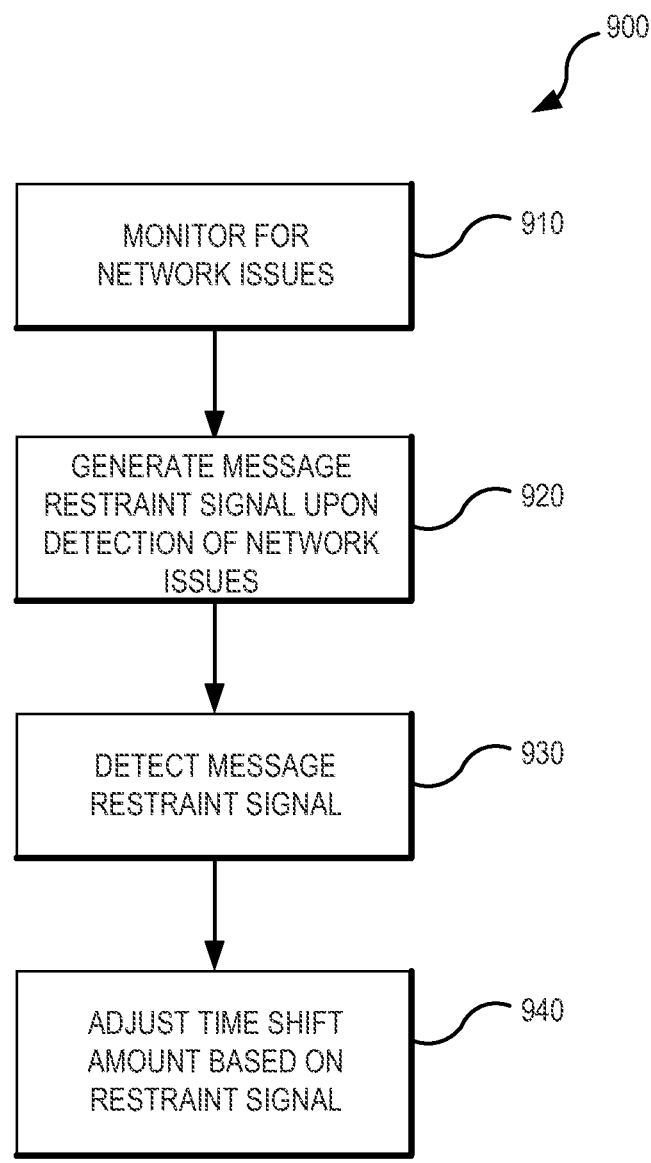
FIG. 9 is a flowchart illustrating a set of operations for adjusting an amount of time shift based on a message restraint signal in accordance with one or more embodiments of the present invention.

FIG. 9 is a flowchart illustrating a set of operations 900 for adjusting an amount of time shift based on a message restraint signal. Monitoring operation 910 monitors for network issues (e.g., network congestion or signal quality). Upon detection of a network issue, generation operation 920 generates a message restraint signal. The message restraint signal may include a restraint level indicator (e.g. low, medium, high). In addition, the message restraint signal may indicate geographic areas for the restraint, a time period to impose the restraint, types of messages for the restraint, and or other information which can be used (e.g., by the mobile device and/or communications network) for determining restraint conditions being requested or imposed. The message restraint signal may be a single message or may be a continuous message on a channel which can be monitored. Once the message is detected by the mobile device and/or communications network during detection operation 930, the restraint level indicator and/or other information within the message restraint signal can be used by adjustment operation 940 to determine the amount time each message should be shifted.

While in some embodiments, the operating system of the mobile device or network device can bundle or otherwise coordinate the data to be transmitted during a single high power channel state, other embodiments allow the data (e.g., video) transmission speed to be adjusted or adapted. When the network gets congested a video transmission may experience continuous rebuffering. As a result, the end user may stop the service. Some embodiments monitor the network for congestion. For example, the network may send congestion signals, such as low, medium, and high, which can be used by an application controller on the mobile device to adjust the data transmission rate or the frequency of communications of one or more applications with their remote servers. In one embodiment, the application controller may stop all data transmissions from selected applications (e.g., low priority applications) when the mobile device is in dormancy mode (e.g., a black screen).

Figure 10:
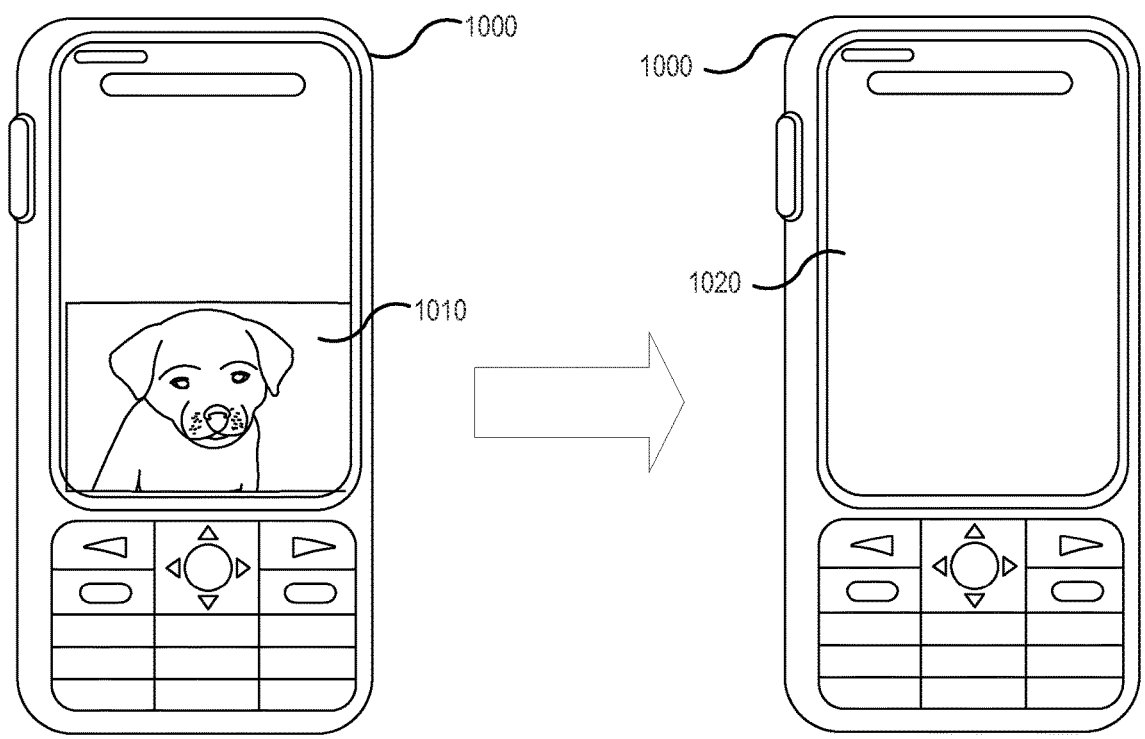
FIG. 10 shows a mobile device in an active state showing a video and the mobile device in an inactive state with a blank screen.

FIG. 10 shows a mobile device 1000 in an active state showing a video 1010 and in an inactive state with a blank screen 1020. Background processes, such as, but not limited to, weather updates, RSS feeds, Facebook updates, etc. may be running on mobile device 1000 in the active state. In addition, basic data processes such as, but not limited to, Google sync, e-mail, IM messages, VoIP calls, etc. may also be running. The application controller can detect when mobile device 1000 transitions into a dormancy mode. Once detected, the application controller may stop some or all of the data transmissions to the network, created by the background processes and/or the basic data processes. In addition, the application controller can determine if some of the data transmissions should be shifted. In order to determine which applications to stop and/or data transmissions to shift, the application controller may consider the level of network congestion, priority level of the application, and/or other factors. As a result of stopping and/or shifting the data transmissions, network congestion is reduced during peak times and the mobile device will benefit from longer battery life and reduced signaling and traffic.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. (Any claims intended to be treated under 35 U.S.C. §112, ¶6 will begin with the words "means for", but use of the term "for"

in any other context is not intended to invoke treatment under 35 U.S.C. §112, ¶6.) Accordingly, the applicant reserves the right to pursue additional claims after filing this application to pursue such additional claim forms, in either this application or in a continuing application.

What is claimed is:

1. A method for operating a mobile device, the method comprising:
   at the mobile device, generating false reports on availability of at least one remote server,
      wherein, in response to receiving the false reports, one or more applications stored in a memory of the mobile device suspend routine status messages;
   at the mobile device, receiving multiple messages from the one or more applications stored in the memory of the mobile device,
      wherein the multiple messages are to be transmitted from the mobile device to at least one remote server through a communications network;
   at the mobile device, coordinating the multiple messages in time to allow for a single transmission of the multiple messages from the mobile device to the at least one remote server via the communications network,
      wherein coordinating the multiple messages in time includes prioritizing the multiple messages based, at least in part, on contextual information associated with the mobile device; and,
      wherein a radio transmitter of the mobile device is in a low power state while coordinating the multiple messages in time; and
   at the mobile device, transmitting the multiple messages to the remote servers through the single transmission, wherein the radio transmitter of the mobile device is transitioned to a high power state only once for the transmission of the multiple messages.

2. The method of claim 1, wherein coordinating the messages in time to allow for the single transmission includes queuing the multiple messages.

3. The method of claim 1, further comprising:
   determining a maximum communication interval needed for each of the applications to communicate with one of the remote servers; and
   computing, based on the maximum communication interval needed for each of the applications, a transmission schedule for transmitting the multiple messages to the remote servers.

4. The method of claim 1, further comprising:
   determining whether a screen of the mobile device is active along with contextual application information; and
   activating the radio transmitter for transmitting the multiple messages when the screen has been determined to be active.

5. The method of claim 1, wherein coordinating the multiple messages in time to allow for a single transmission includes:
   receiving timing requests from the applications that include timing queries for sending the multiple messages; and
   generating callback messages in response to the timing requests indicating when the applications should send the multiple messages.

6. The method of claim 1, wherein the multiple messages are each associated with a processing identifier indicating the application from which the message originated and the method further comprising prioritizing the multiple messages based on the processing identifier.

7. The method of claim 1, wherein the contextual information associated with the mobile device includes a screen status, a battery level, active applications, user preferences, and application priority.

8. The method of claim 1, further comprising:
   receiving additional messages from the one or more applications during the high power state; and
   coordinating the additional messages for transmission using the radio transmitter.

9. A mobile device comprising:
   a radio transmitter;
   a baseband processor configured to manage radio transmissions from the mobile device via the radio transmitter;
   a memory having stored thereon an operating system, a user interface, and multiple applications, wherein the applications are configured to send data from the mobile device to remote servers through a communications network;
   an applications processor (AP) communicably coupled with the memory and configured to run the operating system, the user interface, and the applications stored on the memory;
   an interval optimization module configured to generate false reports on the availability of the remote servers so that the applications run by the applications processor will suspend routine status messages; and
   a coordination module configured to—
      receive data transmission requests from the applications run by the applications processor; and
      bundle data to be transmitted from the mobile device to one or more remote servers during each radio transmission so that the radio transmitter is activated for transmissions once for the bundled data.

10. The mobile device of claim 9, further comprising:
    a status module to determine contextual information; and
    an identification module to assign a dynamic priority level to the applications based on the contextual information determined by status module; or
    a prioritization module configured to receive the contextual information from the status module and to prioritize the messages based on the contextual information.

11. The mobile device of claim 10, wherein the contextual information includes information indicative of a screen status, a battery level, active applications, user preferences, movement of the mobile phone, congestion information about the communications network, and application priority.

12. The mobile device of claim 9, further comprising one or more of the following:
    a time shifting module to shift in time data transmissions from the applications; or
    a callback module to receive transmission requests from the applications and generate a callback to the application to send the data for bundling by the coordination module.

13. A non-transitory computer readable medium, storing instructions for operating a wireless telecommunications device, comprising:
    generating a report on an availability of at least one remote server,
       wherein, upon processing the report, the so that one or more applications suspend routine status messages;
    receiving, from the one or more applications running on an applications processor within the wireless telecommunications device, messages to be transmitted through a communications network using a wireless transmitter of the wireless telecommunications device having a standby mode and an active mode,
  wherein the messages are received from the one or more applications at different times;
generating a message priority for each of the messages;
time shifting the messages from the one or more applications based on contextual information associated with the wireless telecommunications device;
determining the wireless transmitter should transition from the standby mode to the active mode;
  wherein determining whether the wireless transmitter should transition from the standby mode to the active mode includes considering the message priority; and
transmitting the messages to one or more remote servers through the communications network using the wireless transmitter.

14. The non-transitory computer-readable medium of claim 13, further comprising sending, to the one or more applications, a connectivity status indicating the communications network is unavailable to prevent additional messages from the one or more applications.

15. The non-transitory computer-readable medium of claim 13, wherein time shifting the messages includes queuing the messages based on the message priority.

16. The non-transitory computer-readable medium of claim 13, further comprising:
monitoring traffic patterns from each of the one or more applications; and
determining a maximum time shift amount for each application.

17. A method comprising:
receiving messages to be transmitted through a communications network using a wireless transmitter;
receiving a message restraint signal requesting message transmission restraint;
generating a restraint message that includes a false report on the availability of one or more servers that when processed by an application will result in routine status messages being suspended;
time shifting the messages, wherein an amount of time each of the messages is shifted is based at least in part on the received message restraint signal; and,
transmitting the messages in accordance with the time shifting through the communications network using the wireless transmitter.

18. The method of claim 17, wherein the message restraint signal includes a restraint level indicator.

19. The method of claim 17, wherein the messages are received from one or more remote servers to be transmitted through the communications network to one or more mobile devices.

20. The method of claim 17, wherein the messages are received from one or more applications running on an applications processor within a mobile device and are to be transmitted through the communications network to one or more remote servers.

21. The method of claim 17, wherein the amount of time each of the messages is shifted is also based on contextual information associated with one or more mobile devices or a priority level associated with each of the multiple messages.

22. The method of claim 17, wherein the message restraint signal indicates geographic areas for restraint, a time period to impose the restraint, or types of messages for restraint.

23. The method of claim 20, wherein time shifting the messages includes generating callback messages indicating when each of the one or more applications should send the messages.

* * * * *